United States Patent
Kemeny

(10) Patent No.: US 12,144,699 B2
(45) Date of Patent: Nov. 19, 2024

(54) MIXING CAPSULE, IN PARTICULAR FOR THE FIELD OF DENTISTRY

(71) Applicant: KULZER GMBH, Hanau (DE)

(72) Inventor: Andrea Kemeny, Friedrichsdorf (DE)

(73) Assignee: KULZER GMBH, Hanau (DE)

( * ) Notice: Subject to any disclaimer, the term of this patent is extended or adjusted under 35 U.S.C. 154(b) by 737 days.

(21) Appl. No.: 17/268,822

(22) PCT Filed: Sep. 11, 2019

(86) PCT No.: PCT/EP2019/074165
§ 371 (c)(1),
(2) Date: Feb. 16, 2021

(87) PCT Pub. No.: WO2020/053246
PCT Pub. Date: Mar. 19, 2020

(65) Prior Publication Data
US 2021/0186655 A1  Jun. 24, 2021
US 2022/0008166 A2  Jan. 13, 2022

(30) Foreign Application Priority Data

Sep. 12, 2018 (DE) ...................... 10 2018 122 290.4

(51) Int. Cl.
*A61C 5/68* (2017.01)
*A61C 5/64* (2017.01)
(Continued)

(52) U.S. Cl.
CPC .................. *A61C 5/68* (2017.02); *A61C 5/64* (2017.02); *B01F 33/50111* (2022.01);
(Continued)

(58) Field of Classification Search
CPC .... A61C 5/68; A61C 5/64; A61C 5/66; B65D 83/0044
(Continued)

(56) References Cited

U.S. PATENT DOCUMENTS 2,527,991 A * 10/1950 Greenberg ............... A61C 5/66
433/226
3,917,062 A   11/1975 Winters
(Continued)

FOREIGN PATENT DOCUMENTS

DE      102007045154 A1    4/2009
EP           2039317 A1 *  3/2009  ............. A61C 5/064
(Continued)

OTHER PUBLICATIONS

EP 2039317 A1 (Heraeus Kulzer GMBH) (Winterhoff Joerg) Mixing capsule for two-component material, Mar. 25, 2009 [retrieved on Oct. 23, 2023], Translation retrieved from: Espacenet (Year: 2009).*
(Continued)

*Primary Examiner* — Yogesh P Patel
*Assistant Examiner* — Courtney N Huynh
(74) *Attorney, Agent, or Firm* — Norris McLaughlin, P.A.

(57) ABSTRACT

Mixing capsules and methods are provide and comprise a first chamber to receive a composition A and a second chamber to receive a composition B, wherein the first chamber and the second chamber are arranged rotatably about the longitudinal axis of the mixing capsule, the first chamber comprising a first opening, the second chamber comprising a second opening, the first opening and the second opening being arranged perpendicularly to the longitudinal axis and plan-parallelly to each other and/or perpendicularly spaced, the first opening and the second opening being arranged incongruently to each other in a storage position, the first opening and the second opening being arranged congruently to each other in a handling position.

16 Claims, 3 Drawing Sheets

(51) Int. Cl.
*B01F 33/501* (2022.01)
*B01F 35/52* (2022.01)
*B01F 35/71* (2022.01)
*B01F 35/75* (2022.01)
*B01F 101/19* (2022.01)

(52) U.S. Cl.
CPC ........ *B01F 35/522* (2022.01); *B01F 35/7163* (2022.01); *B01F 35/754251* (2022.01); *B01F 2101/19* (2022.01)

(58) Field of Classification Search
USPC .......................................................... 604/148
See application file for complete search history.

(56) References Cited

U.S. PATENT DOCUMENTS

| | | | | |
|---|---|---|---|---|
| 4,175,658 | A | | 11/1979 | Moser et al. |
| 5,887,752 | A | * | 3/1999 | Strother ............... B67D 7/0227 |
| | | | | 222/386 |
| 2009/0298010 | A1 | * | 12/2009 | Broyles ................ B65D 47/305 |
| | | | | 433/90 |
| 2014/0335471 | A1 | * | 11/2014 | McDonald ............... A61C 5/64 |
| | | | | 433/90 |
| 2014/0335474 | A1 | * | 11/2014 | Shaw ..................... A61C 15/02 |
| | | | | 132/329 |

FOREIGN PATENT DOCUMENTS

| | | | |
|---|---|---|---|
| WO | WO-2007104037 A2 * | 9/2007 | ......... A61C 17/0202 |
| WO | 2016/144868 A1 | 9/2016 | |

OTHER PUBLICATIONS

*Skky, Inv.* v. *MindGeek, SARL*, Appeal 16-2018 (Fed. Cir. Jun. 7, 2017) (Year: 2017).*
International Search Report mailed Nov. 14, 2019, in connection with PCT International Application No. PCT/EP2019/074165.
English translation of International Search Report mailed Nov. 14, 2019, in connection with PCT International Application No. PCT/EP2019/074165.
Written Opinion issued in connection with PCT International Application No. PCT/EP2019/074165.

* cited by examiner

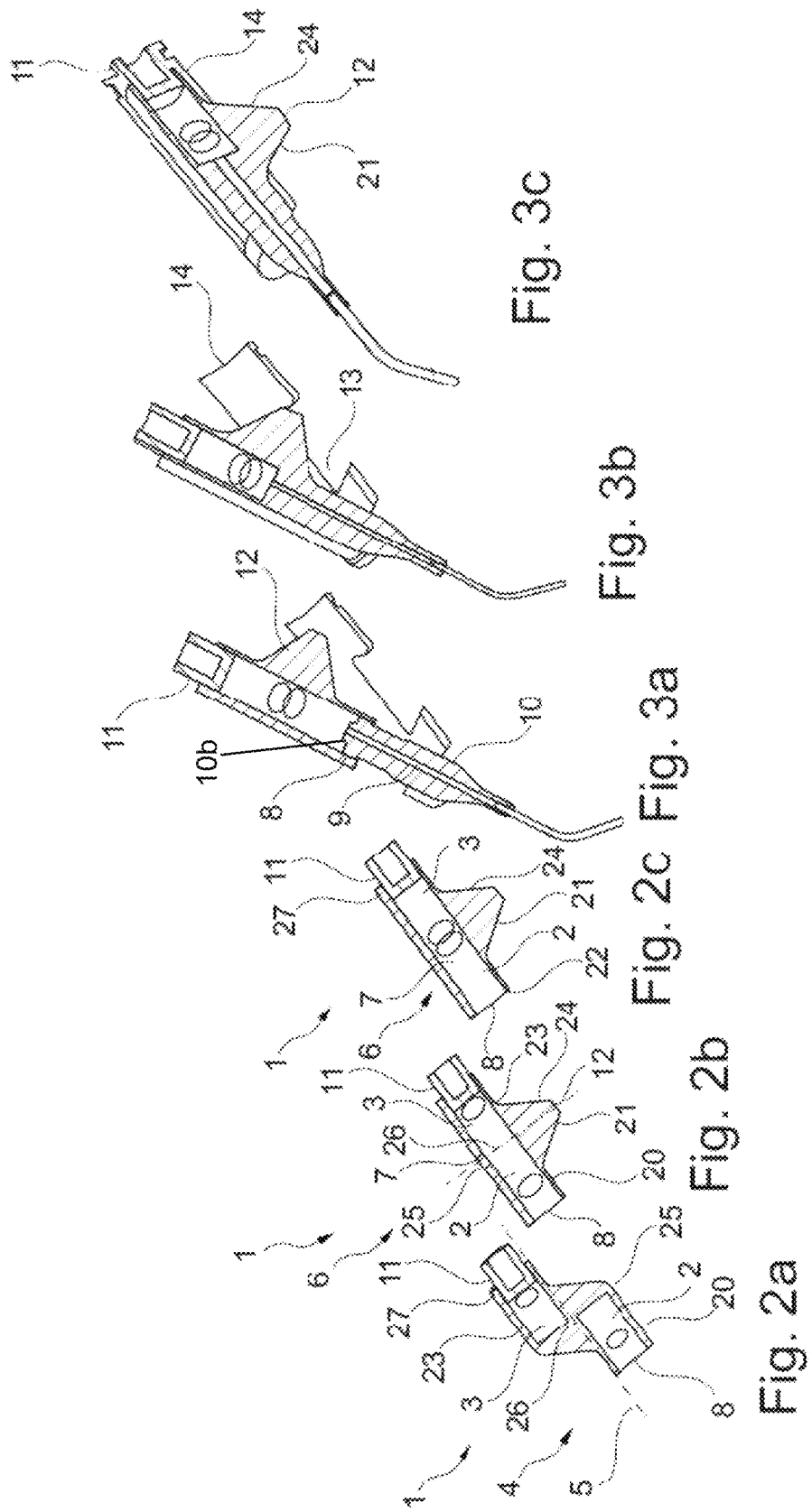

MIXING CAPSULE, IN PARTICULAR FOR THE FIELD OF DENTISTRY

This application is a 371 of International Patent Application No. PCT/EP2019/074165, filed Sep. 11, 2019, which claims foreign priority benefit under 35 U.S.C. § 119 of the German Patent Application No. 10 2018 122 290.4, filed Sep. 12, 2018, the disclosures of which are incorporated herein by reference.

The present invention relates to a mixing capsule, in particular for dental field.

Another subject matter of the invention is a method as well as use of the mixing capsule according to the invention for mixing and applying two-component compositions, preferably of dental 2K-compositions.

A multitude of mixing capsules in dental field being suitable for storing and mixing of two component compositions are known from the state of the art. Mixing capsules in dental field are normally characterised by their short length of approximately 32 mm to allow insertion of the mixing capsule into the fixing brackets of known mixers.

Disadvantageously, the known mixing capsules are normally not adapted to be clamped into a PLT applicator, so that the content of the mixing capsule is conveyable out using a cannula of a PLT applicator.

It was the object of the invention to develop a mixing capsule allowing storage and mixing of pasty to kneadable and optionally with powdered or pasty to solid and concurrently thixotropic multi-component compositions, wherein liquid with powdered components are preferably being mixed also. Furthermore, it was the object to dimension the mixing capsule such to be insertable into PLT applicators, such as being present in dental practices.

The object of the present invention is solved by a mixing capsule comprising a first chamber to receive a composition A and a second chamber to receive a composition B, the first chamber and the second chamber being arranged rotatably about the longitudinal axis of the mixing capsule, the first chamber comprising a first opening, the second chamber comprising a second opening, the first opening and the second opening being arranged perpendicularly to the longitudinal axis and plan-parallelly to each other and perpendicularly to the longitudinal axis, in particular standing perpendicularly on the longitudinal axis, preferably being arranged perpendicularly spaced from the longitudinal axis, the first opening and the second opening being arranged incongruently to each other in a storage position, the first opening and the second opening being arranged congruently to each other in a handling position, and in particular the mixing capsule comprising a first housing and a second housing, and the first housing comprising a first pipe section and a first taped pedestal, the second housing comprising a second pipe section and a second tapered pedestal, the first chamber being arranged within the first pipe section, the second chamber being arranged within the second pipe section, the first housing and the second housing being mounted rotatably to each other about the longitudinal axis being parallel to the first pipe section and the second pipe section, and the longitudinal axis being arranged between the first pipe section and the second pipe section and between or in the first tapered pedestal and in the second tapered pedestal, the tapered pedestals of the first and second housing being adapted to form an engageable handle-like form by rotation about the longitudinal axis.

Particularly preferably, the first opening and the second opening are arranged equally spaced from and perpendicularly to the longitudinal axis to be congruently arranged to each other in handling position. The longitudinal axis of the mixing capsule is preferably arranged parallelly to the longitudinal axis or central axis respectively of the first chamber and parallelly to the longitudinal axis or central axis respectively of the second chamber, the longitudinal axes or central axes respectively of the chambers preferably being equally spaced from the longitudinal axis of the mixing capsule and forming a common longitudinal axis or central axis respectively in handling position that is spaced in particularly from the longitudinal axis of the mixing capsule. The common longitudinal axis or central axis respectively forms the longitudinal axis or central axis respectively of the common mixing chamber.

The longitudinal axis of the mixing capsule is situated between the two chambers and, in particular, is arranged perpendicularly to the first and second plan-parallel opening in storage position, s. FIG. 1a of the first and second chamber, and the longitudinal axis of the mixing capsule is situated laterally to and parallelly offset from the common longitudinal axis or central axis respectively of the common mixing chamber in handling position, the first and second opening in particular coming to be situated congruently above each other. The first and second opening in congruent position outwardly seal the common mixing chamber in handling position. Advantageously, the first and/or second opening may be provided with a seal, such as for example an O-ring or a flat seal made of rubber or silicone.

The longitudinal axis of the mixing capsule is a rotational axis for the first and second housing, the longitudinal axis being situated parallelly to the first chamber and parallelly to the second chamber, in particular parallelly to the first and second pipe section, and the longitudinal axis of the mixing capsule being situated between the first chamber of the first housing, in particular the first pipe section, and a second form at the outer periphery of the second housing, in particular the second form is a pedestal, the longitudinal axis of the mixing capsule being arranged between the second chamber of the second housing and a first form at the outer periphery of the first housing, in particular the first form is a pedestal.

At the same time, the longitudinal axis, in particular as rotational axis, is arranged between the first chamber and the first form as well as between the second chamber and the second form, the longitudinal axis of the mixing capsule running parallelly to the longitudinal axes of the chambers, in particular in both the storage and the handling position.

The mixing capsule according to the invention has the advantage over the state of the art that three functions storing, mixing and applying may happen in one and the same container. The mixing capsule may be transferred from a storage position into a handling position by rotation of the first chamber and/or second chamber about the longitudinal axis of the mixing capsule.

In doing so, in an embodiment, the first chamber is a first lumen in a first pipe section of the mixing capsule. In an embodiment, the second chamber is a second lumen in a second pipe section of the mixing capsule. The first chamber is initially closed by at least one sealing film at the side of the pipe section averting the second chamber. Preferably, the first chamber is initially closed by respectively one sealing film at each side of the pipe section. The second chamber is initially closed by a sealing film at the side facing the first chamber and by a piston at the side averting the first chamber. The sealing films may be easily penetrated, so that the openings of the chambers are formed.

The first opening of the first chamber is situated at the end of the first pipe section facing the second chamber (see FIG.

2a reference sign 25). The second opening of the second chamber is situated at the end of the second pipe section facing the first chamber (see FIG. 2a reference sign 26). The first and second opening are almost situated almost in a plane in storage position running perpendicularly to the longitudinal axis of the mixing capsule, the first and the second opening not falling congruently above each other (see FIG. 2a reference signs 25 and 26). In case the longitudinal axis of the mixing capsule as well as the first longitudinal or central axis respectively of the first chamber and the second longitudinal or central axis respectively of the second chamber being situated in a planar plane and the longitudinal or central axes respectively of the chambers being situated on opposing sides of the longitudinal axis of the mixing capsule in the plane in storing position, the first and second opening come congruently above each other by rotation of the first chamber or second chamber by substantially 180 degrees about the longitudinal axis of the mixing capsule, what corresponds to the handling position. First and second opening communicate with each other and the first and second chamber form a common mixing chamber in the two pipe sections.

Rotation by substantially 180 degrees is required if the first and the second pipe section are angularly spaced by substantially 180 degrees in their storage position. Depending on the relative position of the first and second pipe section to each other in storage position, another angle between 0 to 360 degrees, in particular 15 to 345 degrees, may be required for rotation from storage position into handling position. In an alternative, the openings of the first and second chamber are preferably not situated above each other in storage position, but only in handling position.

In a further embodiment, the first chamber is a first hemisphere and the second chamber is a second hemisphere. In a further embodiment, the first chamber is part of a first ellipsoid and the second chamber is part of a second ellipsoid.

The longitudinal axis of the mixing capsule is the axis running through the center of mass and/or through the point of point symmetry of the mixing capsule when the mixing capsule being symmetrically designed (see FIG. 2a reference sign 5). The mixing capsule has two separated housings being mounted rotatably to each other about the longitudinal axis. Each housing comprises a pipe section and a tapered pedestal (see FIG. 1a). In doing so, the longitudinal axis runs through the two tapered pedestals, in particular through a region of the pedestal being situated in the region of the foot of the pedestal. The pedestals are preferably twisted to each other by substantially 180 degrees in the initial storage position, and are parallel to the two pipe sections being arranged plan-parallelly offset in the initial storage position.

Congruency in geometry means the congruency of point sets. According to this, congruent position of first opening and second opening means the first opening and the second opening are situated substantially congruently above each other.

The mixing capsule according to the invention with capsule housing preferably has a length of less than or equal to 10 cm, preferably less than or equal to 8 cm, particularly preferably a length of less than or equal to 5 cm or less than or equal to 3.5 cm. The common mixing chamber of the mixing capsule preferably has a length of 2.0 to 4.0 cm, in particular of 2.5 to 3.0 cm with a diameter of 0.5 to 2.0 cm, in particular of 0.8 to 1.2 cm. The volume of the common mixing chamber amounts approximately from 20 to 200 $mm^3$, in particular from 50 $mm^3$ to 135 $mm^3$.

In a further embodiment, it is provided for the first opening of the first chamber and the second opening of the second chamber to be arranged rotatably about the longitudinal axis of the mixing capsule and plan-parallelly in relation to each other.

In this way, the mixing capsule may be transferred form a storage position into a handling position by a simple movement (a rotation) in an advantageous manner.

The first opening of the first chamber in the first pipe section of the first housing and the second opening of the second chamber in the second pipe section of the second housing are faced to each other and almost situated in a plane being arranged perpendicularly to the longitudinal axis. Since the first chamber and the second chamber are arranged rotatably about the longitudinal axis of the mixing capsule, the first opening of the first chamber and the second opening of the second chamber are thus rotatable about the longitudinal axis of the mixing capsule also. There is a storage position when the first and second opening being incongruent in which the openings are closed by a sealing film at the same time. There is a handling position when the first and second opening being congruently.

In an embodiment, the first central axis of the first chamber and the second central axis of the second chamber are arranged parallelly to and offset from each other along the longitudinal axis of the mixing capsule in storage position. In a preferred storage position, the first central axis of the first chamber and the second central axis of the second chamber as well as the longitudinal axis of the mixing capsule are situated in a planar plane. In a further embodiment, the first central axis of the first chamber and the second central axis of the second chamber and the longitudinal axis of the mixing capsule are not in a planar plane in storage position.

The first opening of the first chamber and the second opening of the second chamber are arranged incongruently and plan-parallelly to each other in storage position, the first central axis of the first chamber and the second central axis of the second chamber not running coaxially. The first opening of the first chamber rand the second opening of the second chamber are arranged congruently to each other and communicating with each other as well as completely sealing each other in handling position, the first central axis of the first chamber and the second central axis of the second chamber running coaxially.

In case the first chamber being arranged in a first pipe section and the second chamber being arranged in a second pipe section, the first central axis of the first chamber and the second central axis of the second chamber are arranged parallelly to the longitudinal axis of the mixing capsule and plan-parallelly to each other in storage position, the first central axis of the first chamber and the second central axis of the second chamber as well as the longitudinal axis of the mixing capsule being situated in a planar plane (see FIG. 2a). Thus, in this embodiment, only one movement, namely rotation by substantially 180 degrees about the longitudinal axis of the mixing capsule, is required to transfer the mixing capsule from its storage position into its handling position.

The first housing comprising the first pipe section and the first chamber has a first massive form at the outer periphery of the housing in the region of the first opening, in particular partially or over the entire length of the housing, closing the second opening of the second chamber in the second housing in storage position. Said form preferably has a plan-parallel surface being sufficient to close, preferably to tightly close, the second opening of the second chamber in storage position. The second housing comprises the second pipe section and the second chamber, the second housing having a second massive form at the outer periphery in the region of the second opening, in particular partially or over the entire length of the housing, closing the first opening of the first chamber in storage position.

The form preferably has a plan-parallel surface being sufficient to close, preferably to tightly close, the first opening of the first chamber in storage position.

The respective form may preferably be formed in the form of a pedestal, in particular as tapered pedestal, having a plan-parallel surface, each being adapted to close the first and the second opening tightly.

The first massive form of the first housing and the second massive form of the second housing form a common structure in handling position, in an embodiment corresponding to a prism having a triangular cross section formed of two tapered pedestals, which may be positioned into the mounting of an applicator.

The first pipe section has a first central axis. The second pipe section has a second central axis. In an embodiment, the first central axis of the first pipe section and the second central axis of the second pipe section as well as the longitudinal axis of the mixing capsule are in a planar plane in storage position. In a further embodiment, the first central axis of the first pipe section and the second central axis of the second pipe section form an angle of 5 to 180 degrees in relation to the longitudinal axis of the mixing capsule as vertex in storage position. The first central axis of the first pipe section and the second central axis of the second pipe section form an angle of approximately 0 degree in relation to the longitudinal axis of the mixing capsule as vertex in handling position.

In an embodiment, the first central axis of the first chamber and the first central axis of the first pipe section as well as the second central axis of the second chamber and the second central axis of the second pipe section are congruently to each other. In a further embodiment, the first central axis of the first chamber and the first central axis of the first pipe section as well as the second central axis of the second chamber and the second central axis of the second pipe section are incongruently to each other.

In a further embodiment, it is provided for the longitudinal axis of the mixing capsule to be a rotational axis the first chamber and/or the second chamber of the mixing capsule is mounted rotatably about which, synonymous pivotable, in particular starting from storage position of the mixing capsule, by substantially 180 degrees, the mixing capsule being transferable into handling position by rotation of the first chamber and/or the second chamber by substantially 180 degrees about the longitudinal axis of the mixing capsule, the first central axis of the first chamber and the second central axis of the second chamber being arranged coaxially in a line running parallelly to the longitudinal axis in handling position and forming a common mixing chamber in handling position, so that compositions A and B are mixable with each other to composition C in the common mixing chamber by shaking the mixing capsule.

The common mixing chamber is producible from the first and second chamber by simple rotation of the first and/or second pipe section by substantially 180 degrees about the longitudinal axis of the mixing capsule (see FIG. 2b). Additional volume for mixing compositions A and B to composition C is not required. In case of the first central axis of the first chamber and the second central axis of the second chamber standing coaxially to each other, the first chamber and the second chamber communicate with each other via the first and second opening, the first and second opening being congruent to each other and the first and the second opening being parallel and congruent such densely that they seal each other, so that a sealed common mixing chamber is formed.

In an embodiment, the first chamber has a first connection geometry at its side averting the second chamber being adapted to receive a nozzle having a piston section having a centrally situated cannula and means to penetrate a membrane of the common mixing chamber, the cannula being formed communicating with the common mixing chamber at its side facing the common mixing chamber and communicating with the environment at its side averting the common mixing chamber.

Hence, there is a compatibility with a nozzle having a piston section of common PLT applicators in an advantageous manner. The mixing capsule may thus be clamped as interlink into conventional PLT applicators and thus provide composition C for application. Composition C is conveyable out of the common mixing chamber by means of the nozzle having a cannula of the PLT applicator.

A PLT applicator is a pistol-like device for application of compositions in dental field.

For this purpose, the membrane and/or the sealing film at one side of the first chamber averting the second chamber must be penetrated at first. The nozzle having a piston section provides means to penetrate the membrane of the common mixing chamber, wherein the membrane and/or the sealing film at the one side of the first chamber averting the second chamber is the membrane penetrated by the nozzle having the piston section providing means to penetrate the membrane of the common mixing chamber.

In a further embodiment, it is provided for the nozzle, having a piston section having a centrally situated cannula and means to penetrate the membrane, of the common mixing chamber to be introducible into the first chamber displaceably parallelly to the central longitudinal axis so that the common mixing chamber is reducible in respect of its volume.

In this way, pressure is applied to composition C in the common mixing chamber of the mixing capsule in an advantageous manner, so that composition C moves into the cannula of the nozzle and may be dispensed to the environment. The PLT applicator thus discharges composition C to the environment.

In an embodiment, the second chamber has a second connection geometry at its side averting the first chamber, being adapted to receive a piston having a lumen for receiving a press-in piston of a PLT applicator, the piston having a lumen for receiving the press-in piston of a PLT applicator is mounted displaceably parallelly to the longitudinal axis, the mixing chamber is reducible in respect of its volume when the piston being displaced parallelly to the longitudinal axis in the direction of the common mixing chamber.

Thus, the volume of the common mixing chamber may be reduced in an advantageous manner by means of a press-in piston of a PLT applicator by sliding the piston having a lumen and composition C may be ejected out of the mixing capsule through the cannula. The mixing capsule according to the invention may be clamped as interlink between press-in piston and nozzle having a piston section of a PLT applicator. In doing so, it primarily takes up the function of providing mixing product C made of compositions A and B. The PLT applicator merely provides functionality for the ejection process.

In a further embodiment, it is provided for the mixing capsule to comprise a first housing and a second housing, the first housing comprising the first chamber, the second housing comprising the second chamber, the first housing and the second housing each having a combined form of a pipe section and a tapered pedestal.

The first housing having the first massive form comprises the first pipe section and the first chamber. The second housing having the second massive form comprises the second pipe section and the second chamber. In an embodiment, the first massive form forms a first tapered pedestal and the second massive form forms a second tapered pedestal. The first and the second pedestal form a common compact structure in handling position being adapted to be positioned in the mounting of an applicator in a seat-firm manner to thereby fix the mixing capsule to the applicator. The corners of the respective tapered pedestal may be rounded. The tapered pedestals form an engageable form in handling position in an advantageous manner serving in particular for fixation in an applicator, particularly preferably the form is insertable into a punching of a mounting of a PLT applicator (see FIG. 3c). Preferably, the two tapered pedestals form a prism having a triangular cross section in handling position. Thus, there is compatibility with a plurality of usual PLT applicators types. The pedestals preferably serve for the possibility of fixing the mixing capsule in the applicator in handling position.

In an embodiment, the first housing together with the second housing form a shape similar to an inverted Z in storage position, the first housing and the second housing substantially forming a T-shape in handling position.

Thus, compositions A and B are spatially separated from each other in storage position: composition A in the first chamber of the first housing and composition B in the second chamber of the second housing. Separation is ceased in handling position and compositions A and B are present in the common mixing chamber where they are being mixed to composition C. Merely rotation of the housings against each other about substantially 180 degrees is required to transfer the mixing capsule from the storage state into the mixing phase.

In a further embodiment, it is provided for the mixing capsule to have an engageable handle-like form below the longitudinal axis in its handling position, the PLT applicator engaging into its ejection position when the engageable handle-like form being received into a punching of a mounting of the PLT applicator.

In this way, the mixing capsule may be stably and firmly clamped into the PLT applicator in an advantageous manner. Thus, the press-in piston of the PLT applicator may actually move the piston having a lumen of the mixing chamber effectively without the occurrence of shifting or loss of strength. The engageable, handle-like form is formed by the two tapered pedestals of the two housings, being rotatable or mounted rotatably to each other respectively. It offers sufficient resistance by engaging for successful ejection process initiated and realised by the press-in piston of the PLT applicator.

In an embodiment, the first pipe section of the first housing comprises the first chamber and the second pipe section of the second housing comprises the second chamber, the common chamber being formed from the first chamber and the second chamber in handling position of the mixing capsule, the first pipe section and the second pipe section forming a common pipe.

Thus, the common pipe may be incorporated into the gun barrel-like structure of the PLT applicator in an advantageous manner. The common pipe comprises the common mixing chamber, thus becoming part of the PLT applicator.

Thus, composition C in the common mixing chamber may be ejected out of the cannula by means of 'cocking' the PLT applicator.

In a further embodiment, it is provided for the first pipe section to have a first sealing film at its side facing the second pipe section and for a second pipe section to have a second sealing foil at its side facing the first pipe section, the first sealing foil and the second sealing foil being destroyable by force.

In this way, the first and the second chamber may be transferred from a closed state into an opened state in an advantageous manner and without great effort. The first and the second chamber are in a closed state in storage position. The first and the second chamber are in an opened state in handling position. The force being applied by mixing component A and component B is sufficient for the two sealing films to be broken through.

Alternative closing devices for the first and second opening are also conceivable.

In an embodiment, the first chamber has a third sealing film at its side averting the second chamber.

Thus, a third sealing film is situated at the interface between common mixing chamber and nozzle having a pipe section having a cannula which yields or is easy destroyable when the nozzle having a pipe section being inserted into the common mixing chamber. Thus, the mixing capsule may be used as interlink of a PLT applicator in a user-friendly manner.

In a further embodiment, it is provided for the mixing capsule to comprise cyclic olefin polymers, cyclic olefin copolymers, polyethylene, polypropylene, polyethylene having low density, polyethylene having high density, polypropylene having low density, polypropylene having high density and/or mixtures containing at least one of the afore-mentioned polymers.

Cyclic olefin copolymers have high stiffness, strength and hardness as well as low density and high transparency with good acid and lye resistance. The extremely low water absorption/water vapour permeability are to be pointed out. All polyethylene types are characterized by high chemical resistance, good electrical insulation capacity and good gliding behaviour.

PE-HD (HDPE): lightly branched polymer chains, thus high density between 0.94 g/cm$^3$ and 0.97 g/cm$^3$, ('HD' signifies 'high density'). PE-LD (LDPE): strongly branched polymer chains, thus low density between 0.915 g/cm$^3$ and 0.935 g/cm$^3$, ('LD' signifies 'low density'). High crystallinity of polymers leads to high density, stiffness, hardness, abrasion resistance, use temperature and chemical resistance. Polyethylene has high resistance to acids, lyes and further chemicals. Polyethylene hardly absorbs water. Gas and water vapour permeability (only polar gases) is lower than for most plastics; whereas it makes oxygen, carbon dioxide and flavourings passing through well. The properties of polypropylene are similar to polyethylene; it is yet harder and more heat resistant.

The invention also relates to a method for mixing at least two compositions A and B to a composition C in a mixing capsule, the method comprising the steps of:
   (i) transferring the mixing capsule from a storage position into a handling position by rotating a first chamber and/or a second chamber about a longitudinal axis of the mixing capsule until a first opening of the first chamber and a second opening of a second chamber being arranged congruently to each other;

(ii) mixing composition A and composition B in a common mixing chamber by the mixing chamber being moved;

(iii) obtaining composition C.

Thus, a subject matter of the invention is a method for mixing at least two composition A and B to a composition C in the mixing capsule according to the invention, in particular of pasty, kneadable to solid, preferably thixotropic compositions, particularly preferably of dental compositions.

In a further embodiment, it is provided that (ii) mixing composition A and composition B to composition C in a common mixing chamber is realized by a universal mixer for dental materials.

The mixing process may be realised by means of a known commercial mixer, e.g. 3M-ESPE-CAPMIX, by the mixing capsule being clamped into the mounting provided of the mixer. The mixing capsule is moved at least along a part of the longitudinal axis of the mixing capsule or the capsule housing respectively in an oscillating manner when being mixed. Preferably, the mixing capsule with a part of its longitudinal axis is moved along a circular orbit having a radius in an oscillating manner. Alternatively, manual mixing is feasible.

The invention also relates to a method, the method comprising further the steps of:
(iv) putting on the nozzle having the piston section providing means to penetrate a membrane of the common mixing chamber onto the first connection geometry of the first chamber, the common mixing chamber being reduced;
(v) optionally, engaging the engageable handle-like form of the mixing capsule into a punching of a mounting of a PLT applicator, so that the PLT applicator gets to its ejection position.

In doing so, the mixing capsule according to the invention quasi becomes part of a PLT applicator. Composition C, the mixing product made of compositions A and B, is ejectable through the cannula of the PLT applicator by means of the press-in piston of the PLT applicator by clamping the mixing capsule into the PLT applicator.

Furthermore, the invention relates to a use of a mixing capsule in which a second chamber is rotatable into a handling position by rotation about a longitudinal axis of the capsule housing, the second chamber with a first chamber forming a common mixing chamber in handling position.

The invention relates to a use of a mixing capsule for storing, mixing and applying pasty to kneadable dental two-component compositions.

Furthermore, the invention relates to a kit comprising a mixing capsule and a first chamber with a composition A and a second chamber with a composition B.

The mixing capsule may also be used for storing, mixing and applying fluids, powders and liquids. Thus, a mixing capsule has been developed allowing storage and mixing of pasty to kneadable and optionally with powdered or pasty to solid and concurrently thixotropic multi-component compositions, wherein liquid with powdered components are preferably being mixed also. The mixable compositions are preferably thixotropic dental compositions.

Further details, features and advantages of the invention derive from the figures, as well as from the following description of preferred embodiments by reference to the figures. In doing so, the figures merely illustrate exemplary embodiments of the invention not limiting the substantial subject of the invention.

DESCRIPTION OF THE FIGURES

FIG. 2a shows the mixing capsule 1 according to the invention in its starting position, the storage position 4, in cross profile.

FIG. 2b shows the mixing capsule 1 according to the invention in cross profile in its use situation with the handling position 6 after rotation of the second housing 19 by substantially 180 degrees about the longitudinal axis of the mixing capsule.

FIG. 2c shows the mixing capsule 1 according to the invention in cross profile in its use situation with the handling position 6 after penetration of the first sealing film at its first opening 25 and of the second sealing film at its second opening 26 after movement of the mixing capsule 1.

FIG. 3a shows the mixing capsule 1 according to the invention in cross profile with nozzle 10 having piston section 10a, being put onto the first connection geometry 8.

FIG. 3b shows the mixing capsule 1 according to the invention in cross profile with nozzle 10 having piston section 10a, pulled into the common mixing chamber 7.

FIG. 3c shows the mixing capsule 1 according to the invention in cross profile in the state of being inserted into the mounting 14 with nozzle 10 having piston section 10a (see FIG. 4), pulled into the common mixing chamber 7 (see FIGS. 2b and 2c).

EMBODIMENTS OF THE INVENTION

Figure 1A:
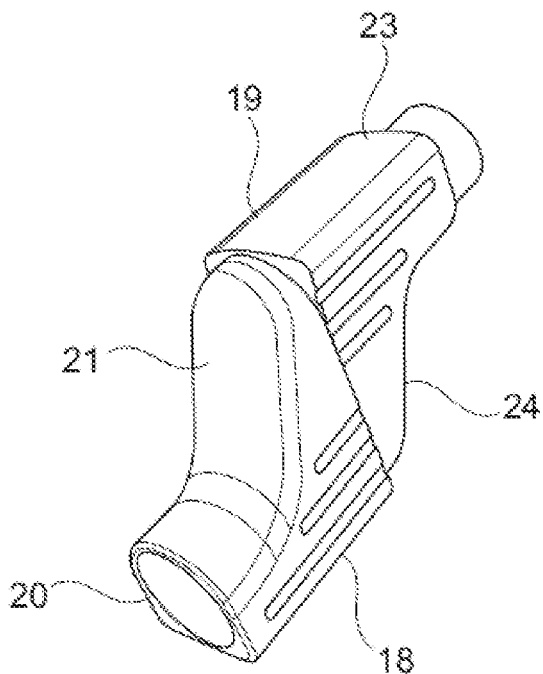
FIG. 1a shows the mixing capsule 1 according to the invention in its starting position, the storage position 4.

FIG. 1a shows the mixing capsule 1 according to the invention in its starting position, the storage position 4. The mixing capsule 1 consists of two housings, a first housing 18 and a second housing 19. The first housing 18 consists of a first pipe section 20 and a first tapered pedestal 21. The second housing 19 consists of a second pipe section 23 and a second tapered pedestal 24. The first chamber 2 is arranged within the first pipe section 20. The second chamber 3 is arranged within the second pipe section 23. The first housing 18 and the second housing 19 are mounted rotatably to each other about a longitudinal axis being arranged parallelly to the first pipe section 20 and the second pipe section 23 and between the first pipe section 20 and the second pipe section 23 in the first tapered pedestal 21 and in the second tapered pedestal 24, in particular if the mixing capsule is arranged in a storage position. Particularly preferably, in storage position, the longitudinal axis of the mixing capsule as well as the first longitudinal or central axis respectively of the first chamber and the second longitudinal or central axis respectively of the second chamber are situated in a planar plane and the longitudinal or central axes respectively of the chambers on opposing sides of the longitudinal axis of the mixing capsule in the plane.

Figure 1B:
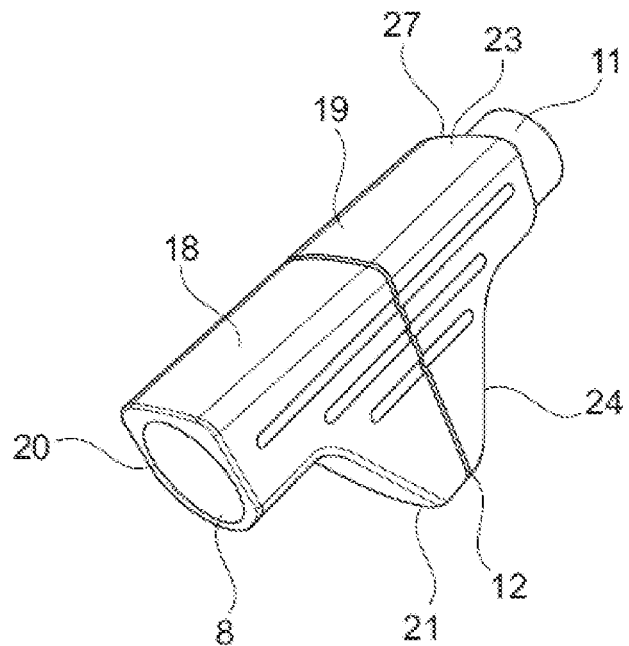
FIG. 1b shows the mixing capsule 1 according to the invention in its use situation with the handling position 6.

FIG. 1b shows the mixing capsule 1 according to the invention in its use situation with the handling position 6 after the second housing 19 being rotated by substantially 180 degrees about the longitudinal axis being arranged parallelly to the first pipe section 20 and the second pipe section 23 and between the first pipe section 20 and the second pipe section 23 in the first tapered pedestal 21 and in the second tapered pedestal 24 initially in storage position 4 of the second housing 19. The first central axis of the first pipe section 20 and the second central axis of the second pipe section 23 are now situated coaxially in a line and the first tapered pedestal 21 and the second tapered pedestal 24 form an engageable handle-like form 12. The first chamber 2 arranged in the first pipe section 20 and the second chamber 3 arranged in the second pipe section 23 are now situated coaxially in a line. The first pipe section 20 has a first connection geometry 8 to receive a nozzle 10 having a piston section 10a and a cannula 9 of a PLT applicator 15 (not sketched in). The second pipe section 23 has a second connection geometry 27 to receive a piston 11.

FIG. 2a shows the mixing capsule 1 according to the invention in starting position, the storage position 4, in cross profile. The first chamber 2 in the first pipe section 20 is situated offset along the longitudinal axis and parallelly to the second chamber 3 in the second pipe section 23. The first chamber 2 contains composition A. The second chamber 3 contains composition B. The first chamber 2 has the first connection geometry 8 to receive a nozzle 10 having a piston section 10a and a cannula 9 of a PLT applicator 15 (not sketched in). The second chamber 3 has the second connection geometry 27 to receive a piston 11. The first chamber 2 is closed by a first sealing film at its first opening 25 at the side averting the connection geometry 8. The second chamber 3 is closed by a second sealing film at a second opening 26 at the side averting the piston 11.

FIG. 2b shows the mixing capsule 1 according to the invention in cross profile in its use situation with the handling position 6, after the second housing 19 being rotated by substantially 180 degrees about the longitudinal axis which is arranged parallelly to the first pipe section 20 and the second pipe section 23 and between the first pipe section 20 and the second pipe section 23 in the first tapered pedestal 21 and in the second tapered pedestal 24 initially in storage position 4 of the second housing 19. The first central axis of the first pipe section 20 and the second central axis of the second pipe section 23 are now situated coaxially in a line and the first tapered pedestal 21 and the second tapered pedestal 24 form an engageable handle-like form 12. The first chamber 2 arranged in the first pipe section 20 and the second chamber 3 arranged in the second pipe section 23 are now situated coaxially in a line. The first pipe section 20 has a first connection geometry 8 to receive a nozzle 10 having a piston section 10a and a cannula 9 of a PLT applicator (not sketched in). The second pipe section 23 has a second connection geometry 27 to receive a piston 11. The first chamber 2 is closed by a first sealing film at the first opening 25 at the side averting the first connection geometry 8. The second chamber 3 is closed by a second sealing film at the second opening 26 at the side averting the piston 11.

FIG. 2c shows a mixing capsule 1 according to the invention in cross profile in its use situation with the handling position 6, after the first sealing foil at the first opening 25 and the second sealing foil at the second opening 26 being penetrated after the mixing capsule 1 being moved. The first chamber 2 and the second chamber 3 form a common mixing chamber 7. Composition A and composition B may now be mixed to a composition C.

Figure 4:
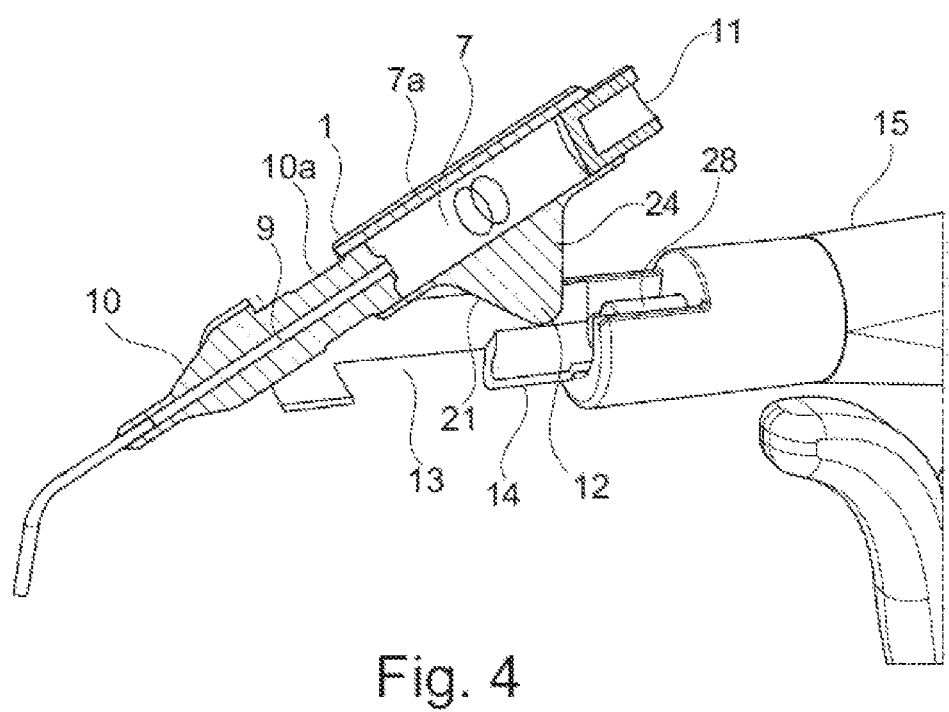
FIG. 4 shows the mixing capsule 1 according to the invention with a PLT applicator 15.

FIG. 3a shows the mixing capsule 1 according to the invention in cross profile with nozzle 10 having a piston section 10a of a PLT applicator, put on the first connection geometry 8 (see FIG. 4). The nozzle 10 has a centrally situated cannula 9 and means to penetrate the membrane 10b. In its starting position, the nozzle 10 is situated at the edge of the common mixing chamber 7 next to the first connection geometry 8.

FIG. 3b shows the mixing capsule 1 according to the invention in cross profile with nozzle 10 having a piston section 10a of a PLT applicator, pulled into the common mixing chamber 7 (see FIG. 4). The internal volume of the common mixing chamber 7 is reduced to a minimum. Composition C is strongly compressed. The mixing capsule 1 is situated on a mounting 14 of a PLT applicator 15 (not sketched in). The mounting 14 has a punching 13.

FIG. 3c shows the mixing capsule 1 according to the invention in cross profile in the state of being inserted into the punching 13 of the mounting 14 of a PLT applicator 15 with nozzle 10, pulled into the common mixing chamber. The tapered pedestals 21, 24 of the first and second housing 18, 19 form an engageable handle-like form 12 being insertable into the punching 13 of the mounting 14 of the PLT applicator 15. The mixing capsule 1 is now ready for application, i.e. for discharging composition C from the mixing capsule 1 by means of the PLT applicator 15 with the piston 11 received by the second connection geometry 27 of the second pipe section 23 (see FIGS. 2a-2c and 3a-3c).

FIG. 4 shows the mixing capsule 1 according to the invention with a PLT applicator 15. The PLT applicator 15 has a mounting 14 having a punching 13 in which the engageable handle-like form 12 made of the tapered pedestals 21, 24 of the mixing capsule 1 is insertable. The piston 11 is pressable into the common mixing chamber 7 by a press-in piston 28 of the PLT applicator 15 in its thus inserted state, thus conveying composition C out of the mixing capsule 1 through the cannula 9 of the nozzle 10 having a piston section 10a.

LIST OF REFERENCE NUMERALS 1 mixing capsule
2 first chamber
3 second chamber
4 storage position
5 longitudinal axis
6 handling position
7 common mixing chamber
7a membrane
8 first connection geometry
9 cannula
10 nozzle
10a piston section
10b means to penetrate the membrane
11 piston
12 engageable handle-like form
13 punching
14 mounting
15 PLT applicator
18 first housing
19 second housing
20 first pipe section
21 first tapered pedestal
22 third sealing film
23 second pipe section
24 second tapered pedestal
25 first opening
26 second opening
27 second connection geometry
28 press-in piston

The invention claimed is:

1. A mixing capsule (1) comprising a first chamber (2) to receive a composition A and a second chamber (3) to receive a composition B, the first chamber (2) and the second chamber (3) being arranged rotatably about a longitudinal axis (5) of the mixing capsule (1), the first chamber (2) comprising a first opening (25), the second chamber (3) comprising a second opening (26), the first opening (25) and the second opening (26) being arranged perpendicularly to the longitudinal axis (5) and faced to each other as well as plan-parallelly to each other and perpendicularly to the longitudinal axis, the first opening (25) and the second opening (26) being arranged incongruently to each other in a storage position (4), the first opening (25) and the second opening (26) being arranged congruently to each other in a handling position (6), the mixing capsule (1) comprising a first housing (18) and a second housing (19), the first housing (18) comprising a first pipe section (20) and a first tapered pedestal (21), the second housing (19) comprising a second pipe section (23) and a second tapered pedestal (24), the first chamber (2) being arranged within the first pipe section (20), the second chamber (3) being arranged within the second pipe section (23), the first housing (18) and the second housing (19) being mounted rotatably to each other about the longitudinal axis being parallel to the first pipe section (20) and the second pipe section (23), and the longitudinal axis being arranged between the first pipe section (20) and the second pipe section (23) and between or in the first tapered pedestal (23) and in the second tapered pedestal (24), wherein the first tapered and second tapered pedestals (21, 24) of the first and second housing (18, 19) are adapted to form an engageable handle-like form (12) by rotation about the longitudinal axis, wherein the first chamber (2) has a connection geometry (8) at its side averting the second chamber (3) being adapted to receive a nozzle (10) having a piston section (10a) having a centrally situated cannula (9), the cannula being formed for communicating with a common mixing chamber (7) at its side facing the common mixing chamber (7) and communicating with an environment at its side averting the common mixing chamber (7), and wherein the common mixing chamber (7) is reducible in respect of its volume by the nozzle (10) having the piston section (10a), having the centrally situated cannula (9), to penetrate a membrane of the common mixing chamber (7), wherein the means (10b) to penetrate the membrane is displaceably introducible into the first chamber (2) parallelly to the longitudinal axis (5), wherein a membrane at the side of the first chamber (2) averting the second chamber (3) is penetrated at first, and wherein the second chamber (3) comprises a second connection geometry (27) at its side averting the first chamber (2) being adapted to receive a piston (11) having a lumen to receive a press-in piston (28) of a PLT applicator (15), the piston (11) having a lumen to receive a press-in piston (28) of a PLT applicator (15) being mounted displaceably parallelly to the longitudinal axis (5), the common mixing chamber (7) being reducible in respect of its volume when the piston (11) is being displaced parallelly to the longitudinal axis (5) in the direction of the common mixing chamber (7).

2. The mixing capsule (1) according to claim 1, wherein the first opening (25) of the first chamber (2) and the second opening (26) of the second chamber (3) are rotatable about the longitudinal axis (5) of the mixing capsule and are arranged plane-parallelly in relation to each other.

3. The mixing capsule (1) according to claim 2, wherein a first central axis of the first chamber (2) and a second central axis of the second chamber (3) are arranged parallelly to and offset from each other along the longitudinal axis (5) of the mixing capsule in the storage position (4).

4. The mixing capsule (1) according to claim 3, wherein the longitudinal axis (5) of the mixing capsule is a rotational axis, the first chamber (2) and/or the second chamber (3) is mounted rotatably about which, the mixing capsule (1) being transferable into the handling position (6) by rotation of the first chamber (2) and/or the second chamber (3) about the longitudinal axis (5) of the mixing capsule (1), the first central axis of the first chamber (2) and the second central axis of the second chamber (3) being arranged coaxially in a line running parallelly to the longitudinal axis (5) and forming the common mixing chamber (7) in the handling position (6), so that compositions A and B are mixable with each other to composition C in the common mixing chamber (7) by shaking the mixing capsule (1).

5. The mixing capsule (1) according to claim 1, wherein the mixing capsule (1) comprises the first housing (18) and the second housing (19), the first housing (18) comprising the first chamber (2), the second housing (19) comprising the second chamber (3), the first housing (18) and the second housing (19) each having a combined shape made of the first pipe and second pipe sections and the first tapered and second tapered pedestals (21, 24).

6. The mixing capsule (1) according to claim 5, wherein, in the storage position (4), the first tapered and second tapered pedestals (21, 24) are opposite with respect to each other and, in the handling position (6), the first tapered and second tapered pedestals (21, 24) form a V-shape.

7. The mixing capsule (1) according to claim 1, wherein an engageable handle-like form (12) of the mixing capsule below the longitudinal axis (5) in the handling position (6) is configured to be received into a punching (13) of a mounting (14) of a PLT applicator (15) to engage the PLT applicator into its ejection position.

8. The mixing capsule (1) according to claim 1, wherein the first pipe section (20) of the first housing (18) comprises the first chamber (2) and the second pipe section (23) of the second housing (19) comprises the second chamber (3), the common mixing chamber (7) being formed from the first chamber (2) and the second chamber (3) in the handling position (6) of the mixing capsule (1), the first pipe section (20) and the second pipe section (23) forming a common pipe.

9. The mixing capsule (1) according to claim 8, wherein the first pipe section (20) has a first sealing film at its side facing the second pipe section (23) and the second pipe section (23) has a second sealing film at its side facing the first pipe section (20), the first sealing film and the second sealing film being destroyable by force.

10. The mixing capsule (1) according to claim 1, wherein the first chamber (2) has a third sealing film (22) at its side averting the second chamber (3).

11. The mixing capsule (1) according to claim 1, wherein the mixing capsule comprises cyclic olefin polymer, cyclic olefin copolymers, polyethylene, polypropylene, polyethylene having low density, polyethylene having high density, polypropylene having low density, polypropylene having high density and/or mixtures containing at least one of the afore-mentioned polymers.

12. A method for mixing at least two compositions A and B to a composition C in the mixing capsule according to claim 1, the method comprising the steps of:

(i) transferring the mixing capsule from the storage position (4) into the handling position (6) by rotating the first chamber (2) and/or the second chamber (3) about the longitudinal axis (5) of the mixing capsule (1) until the first opening (25) of the first chamber and the second opening (26) of the second chamber are arranged congruently to each other;
   (ii) mixing composition A and composition B in the common mixing chamber (7) by the mixing capsule (1) being moved;
   (iii) obtaining composition C.

13. The method according to claim 12, wherein (ii) mixing composition A and composition B to composition C in the common mixing chamber (7) is realised by a universal mixer for dental materials.

14. A method of using the mixing capsule (1) according to claim 1, in which the second chamber (3) is rotatable into the handling position (6) by rotation about the longitudinal axis of the capsule housing, the second chamber with the first chamber (2) forming the common mixing chamber (7).

15. The method of using the mixing capsule (1) according to claim 14 for storing, mixing and application of pasty to kneadable compositions.

16. A kit comprising:
   the mixing capsule (1) according to claim 1;
   the first chamber (2) contains the composition A; and
   the second chamber (3) contains the composition B.

* * * * *